(12) United States Patent
Ishibashi et al.

(10) Patent No.: US 8,040,402 B2
(45) Date of Patent: Oct. 18, 2011

(54) IMAGING APPARATUS

(75) Inventors: Shinya Ishibashi, Osaka (JP); Toshihisa Maeda, Osaka (JP)

(73) Assignee: Sony Corporation (JP)

( * ) Notice: Subject to any disclaimer, the term of this patent is extended or adjusted under 35 U.S.C. 154(b) by 401 days.

(21) Appl. No.: 12/317,643

(22) Filed: Dec. 23, 2008

(65) Prior Publication Data

US 2009/0167905 A1 Jul. 2, 2009

(30) Foreign Application Priority Data

Dec. 26, 2007 (JP) ................................ P2007-334196

(51) Int. Cl.
*H04N 5/217* (2011.01)
(52) U.S. Cl. ........................................................ 348/241
(58) Field of Classification Search ....... 348/207.99–376
See application file for complete search history.

(56) References Cited

U.S. PATENT DOCUMENTS

2002/0167600 A1* 11/2002 Baer .............................. 348/243
2006/0092297 A1* 5/2006 Lee et al. ...................... 348/241

FOREIGN PATENT DOCUMENTS

JP 2000-209506 A 7/2000

* cited by examiner

*Primary Examiner* — David Ometz
*Assistant Examiner* — Akshay Trehan
(74) *Attorney, Agent, or Firm* — Lerner, David, Littenberg, Krumholz & Mentlik, LLP

(57) ABSTRACT

An imaging apparatus includes:
an imaging device including first and second pixels;
imaging control means for carrying out a first imaging action and a second imaging action;
storage means for storing first image data acquired from the first pixels in the first imaging action and second image data acquired from the first pixels in the second imaging action;
noise data acquisition means for acquiring first noise data based on pixel signals produced in the second pixels in the first imaging action and acquiring second noise data based on pixel signals produced in the second pixels in the second imaging action;
noise estimation means for estimating a noise component in the first image data using the second image data and a noise ratio of the noise in an exposure period to the noise in a non-exposure period; and
noise correction means for removing the noise component from the first image data.

8 Claims, 13 Drawing Sheets

1A, 1B, 1C, 1D, 1E 1A, 1B, 1C, 1D, 1E 1A, 1B, 1C, 1D, 1E

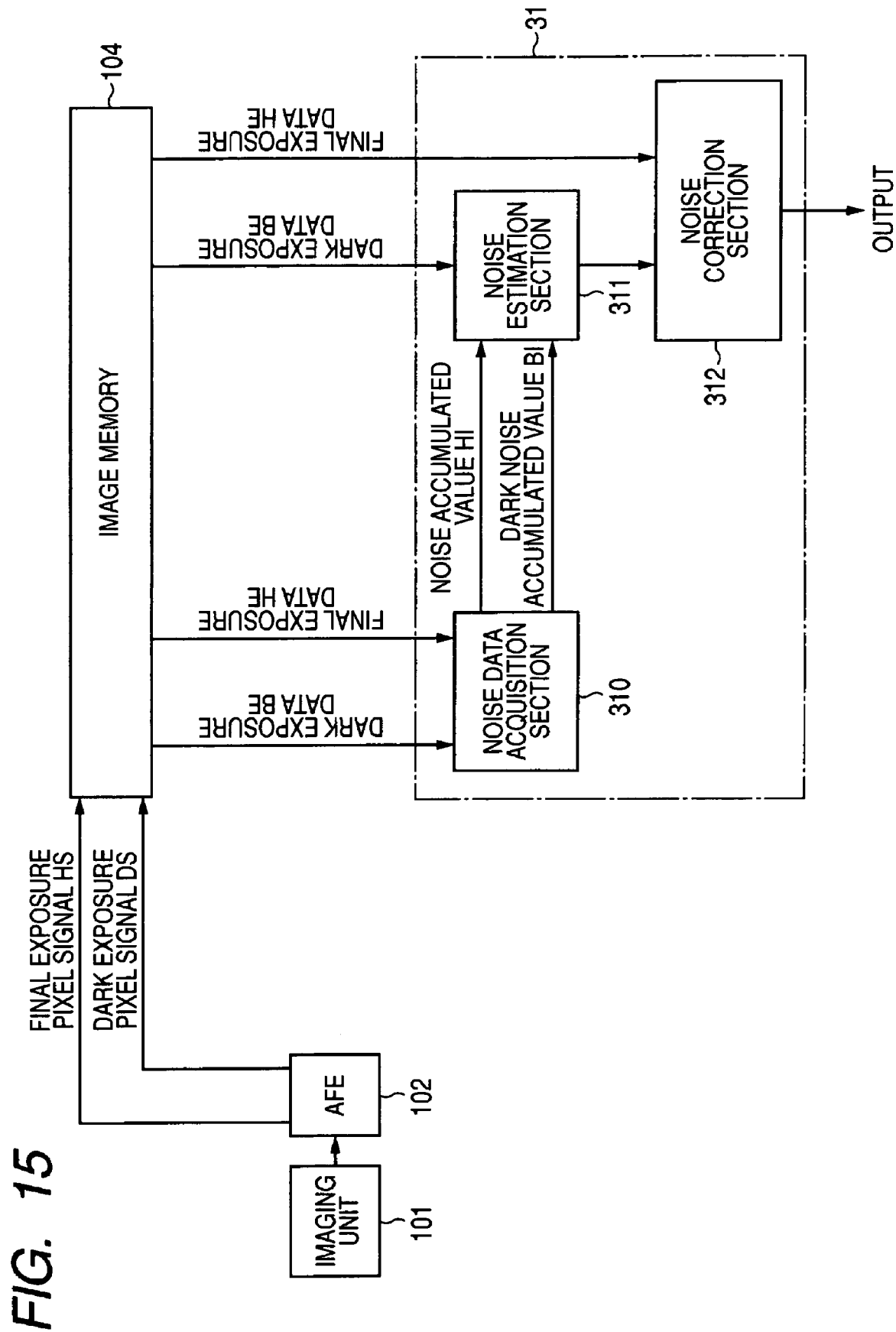

IMAGING APPARATUS

CROSS REFERENCES TO RELATED APPLICATIONS

The present application claims priority from Japanese Patent Application No. JP 2007-334196, filed in the Japanese Patent Office on Dec. 26, 2007, the entire content of which is incorporated herein by reference.

BACKGROUND OF THE INVENTION

1. Field of the Invention

The present invention relates to a technology for processing an image acquired by an imaging apparatus.

2. Description of the Related Art

In recent years, an imaging apparatus called a digital camera, which uses a CCD or any other imaging device to acquire an image of a subject (captured image), has been widely used. Since such an imaging device provided in a digital camera produces electric charge called dark current, a captured image acquired by the imaging device also contains noise due to the dark current (also referred to "dark current noise").

An example of a method for removing dark current noise from a captured image has been proposed (JP-A-2000-209506). In this technology, after the imaging device is exposed to light (final exposure), imaging operation is carried out with light impinging on the imaging device blocked (dark exposure), and the output from the imaging device in the dark exposure is subtracted from the output from the imaging device in the final exposure to remove dark current noise from a captured image.

SUMMARY OF THE INVENTION

However, since the dark current generated in an imaging device changes with the temperature of the imaging device, the amount of dark current noise generated in the final exposure and the amount of dark current noise generated in the dark exposure change due to heat generated when the imaging device is driven. Therefore, the technology described in JP-A-2000-209506 does not allow the dark current noise to be precisely removed from a captured image acquired in the final exposure.

Thus, it is desirable to provide a technology by which noise components can be precisely removed from a captured image acquired in the final exposure.

An imaging apparatus according to one embodiment of the invention includes an imaging device including first pixels capable of receiving light from a subject and second pixels incapable of receiving the subject light, imaging control means for carrying out a first imaging action in an exposure period during which the imaging device is exposed to light and carrying out a second imaging action in a non-exposure period during which the imaging device is not exposed to light, storage means for storing first image data acquired from the first pixels in the first imaging action and second image data acquired from the first pixels in the second imaging action, noise data acquisition means for acquiring first noise data based on pixel signals produced in the second pixels in the first imaging action and acquiring second noise data based on pixel signals produced in the second pixels in the second imaging action, noise estimation means for estimating a noise component contained in the first image data by using the second image data and a noise ratio of the noise generated in the exposure period to the noise generated in the non-exposure period, the noise ratio calculated by using the first noise data and the second noise data, and noise correction means for removing the noise component from the first image data.

An imaging apparatus according to another embodiment of the invention includes an imaging device including first pixels capable of receiving light from a subject and second pixels incapable of receiving the subject light, imaging control means for carrying out a first imaging action in an exposure period during which the imaging device is exposed to light and carrying out a second imaging action in a non-exposure period during which the imaging device is not exposed to light, storage means for storing first image data acquired from the first pixels in the first imaging action and second image data acquired from the first pixels in the second imaging action, noise data acquisition means for acquiring first noise data based on pixel signals produced in the second pixels in the first imaging action and acquiring second noise data based on pixel signals produced in the second pixels in the second imaging action, monitoring means for monitoring the amount of the second noise data, and noise correction means for removing a noise component from the first image data. The imaging control means initiates the second imaging action after the first imaging action is completed and terminates the second imaging action when the amount of the second noise data becomes substantially the same as the amount of the first noise data, and the noise correction means removes the noise component by subtracting the second image data from the first image data.

An imaging apparatus according to still another embodiment of the invention includes an imaging device including first pixels capable of receiving light from a subject and second pixels incapable of receiving the subject light, imaging control means for carrying out a first imaging action in an exposure period during which the imaging device is exposed to light and carrying out a second imaging action in a non-exposure period during which the imaging device is not exposed to light, first storage means for storing first image data acquired from the first pixels in the first imaging action, second storage means for storing second image data acquired from the first pixels in the second imaging action and noise image data acquired from the second pixels in the second imaging action, noise data acquisition means for acquiring first noise data based on pixel signals produced in the second pixels in the first imaging action and acquiring second noise data based on the noise image data, noise estimation means for estimating a noise component contained in the first image data by using the second image data and a noise ratio of the noise generated in the exposure period to the nose generated in the non-exposure period, the noise ratio calculated by using the first noise data and the second noise data, and noise correction means for removing the noise component from the first image data.

According to the embodiments of the invention, since the noise ratio of the noise generated in the exposure period to the nose generated in the non-exposure period is calculated, and the noise ratio along with the second image data acquired in the non-exposure period is used to estimate a noise component contained in the first image data acquired in the exposure period, the noise component can be precisely removed from a captured image acquired in final exposure.

BRIEF DESCRIPTION OF THE DRAWINGS

FIG. 15 is a block diagram of noise removal performed in an imaging apparatus according to a variation.

DESCRIPTION OF THE PREFERRED EMBODIMENTS

1. First Embodiment

A first embodiment of the invention will be described below with reference to the drawings.

1-1. Configuration

Figure 1:
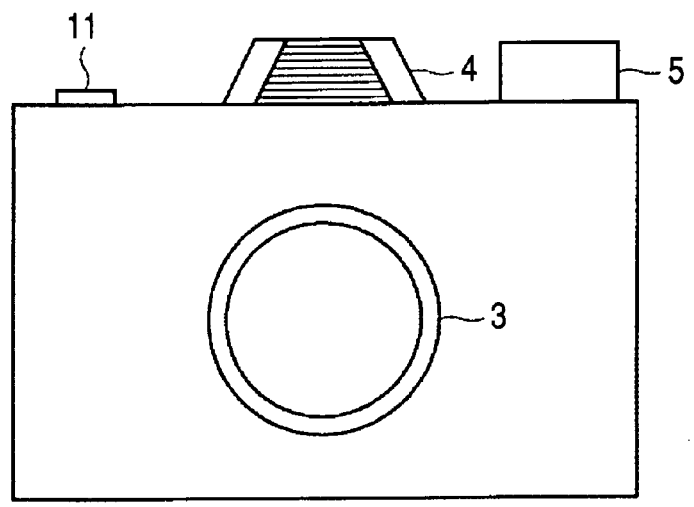
FIG. 1 shows an external configuration of an imaging apparatus.
Figure 2:
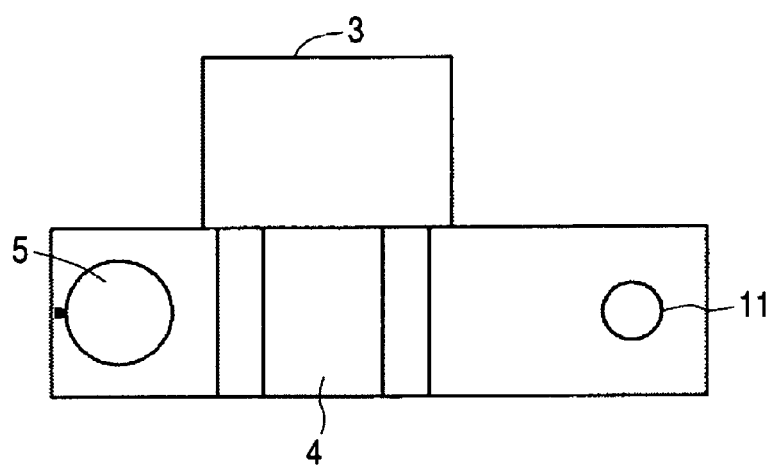
FIG. 2 shows an external configuration of the imaging apparatus.
Figure 3:
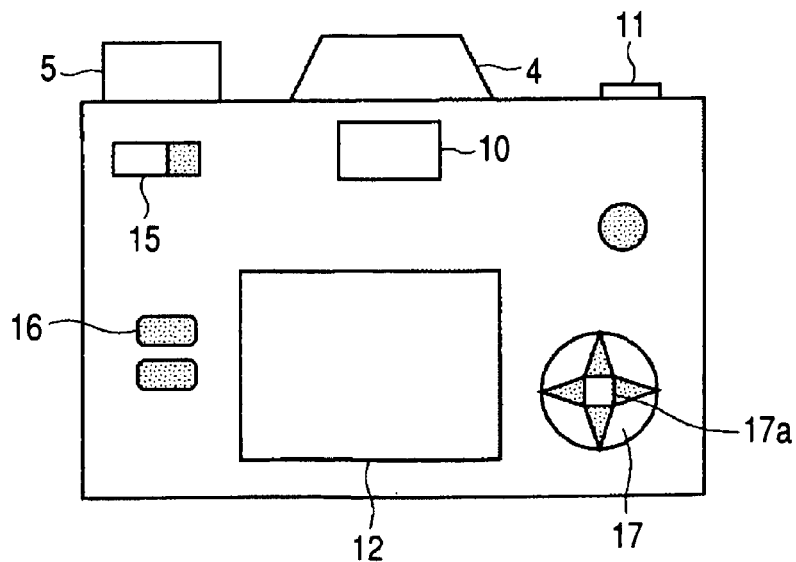
FIG. 3 shows an external configuration of the imaging apparatus.

FIGS. 1, 2, and 3 show an external configuration of an imaging apparatus 1A according to the first embodiment of the invention. FIG. 1 is a front exterior view of the imaging apparatus 1A. FIG. 2 is a top exterior view of the imaging apparatus 1A. FIG. 3 is a rear exterior view of the imaging apparatus 1A.

The imaging apparatus 1A is configured as a digital camera, and includes an imaging lens 3 in a front portion of the imaging apparatus 1A (see FIG. 1).

The imaging lens 3 mainly includes a group of lenses, an aperture, and other components. The group of lenses includes a focusing lens that moves in the optical axis direction to change the position of the focal point.

The imaging apparatus 1A further includes a release button (shutter button) 11 for instructing the apparatus to start exposure, a flash 4, and a mode dial 5 on the upper side of the imaging apparatus 1A (see FIG. 2).

The release button 11 is a two-state detection button capable of detecting two states, a half-pressed state (S1 state) and a fully-pressed state (S2 state). When the release button 11 is pressed halfway into the half-pressed state, preparation actions (a phase-difference-based autofocus (AF) control action and an auto exposure (AE) control action, for example) for acquiring and recording a still image of a subject (final captured image) are carried out. When the release button 11 is further pressed into the fully-pressed state, actions of capturing the final captured image (a series of actions including an exposure action of using an imaging device (which will be described later) to acquire a subject image and a predetermined image processing action on an image signal obtained by the exposure action) are carried out.

The mode dial 5 mainly includes a rotatable disc-shaped member. Rotating the mode dial 5 allows a user to select and enable a desired imaging mode.

For example, when the mode dial 5 is rotated and a manual mode (M mode) is selected, the user can manually determine the shutter speed and the aperture value. Further, operating a direction selection key 17 (FIG. 3) or other operation components in the manual mode allows a bulb (extended period exposure) imaging mode to be selected. In the bulb imaging, as long as the release button 11 is pressed (the fully-pressed state continues), the shutter remains open and an image that has received desired-period exposure (extended period exposure image) can be acquired.

The imaging apparatus 1A further includes a monitor 12, a finder window 10, a main switch (power switch) 15, a menu button 16, and the direction selection key 17 on the backside of the imaging apparatus 1A (see FIG. 3).

More specifically, the monitor (also referred to as "display section") 12 is provided at a substantially central portion of the backside of the imaging apparatus 1A. The monitor 12 includes, for example, a color liquid crystal display (LCD). The monitor 12 can display a menu screen for setting imaging conditions and other parameters, and reproduce and display a captured image recorded in a recording device 105, such as a memory card, (see FIG. 4).

The finder window 10 is provided above the monitor 12. An image of a subject is delivered to the finder window 10, and the photographing user can look into the finder window 10 and visually recognize the subject image to determine a composition.

The main switch 15 is provided on the upper left of the monitor 12. The main switch 15 includes a two-contact slide switch. When the contact is set to a left "OFF" position, the imaging apparatus 1A is turned off, whereas when the contact is set to a right "ON" position, the imaging apparatus 1A is turned on.

The direction selection key (cursor key) 17 is provided on the right of the monitor 12. The direction selection key 17 detects four types of pressing operation, up, down, right, and left. The direction selection key 17 detects another type of pressing operation on a center push button (enter button) 17a as well as the above four types of pressing operation.

The menu button 16 is provided on the left of the monitor 12. When the menu button 16 is pressed, the monitor 12 displays the menu screen (setting screen). The user uses the direction selection key 17 and other operation buttons to carry out selecting or setting operation on the menu screen (also simply referred to as "menu operation"). In this way, the user can set detailed actions (AF mode, for example), register imaging conditions, and carry out other operation of the imaging apparatus 1A.

1-2. Functions

Figure 4:
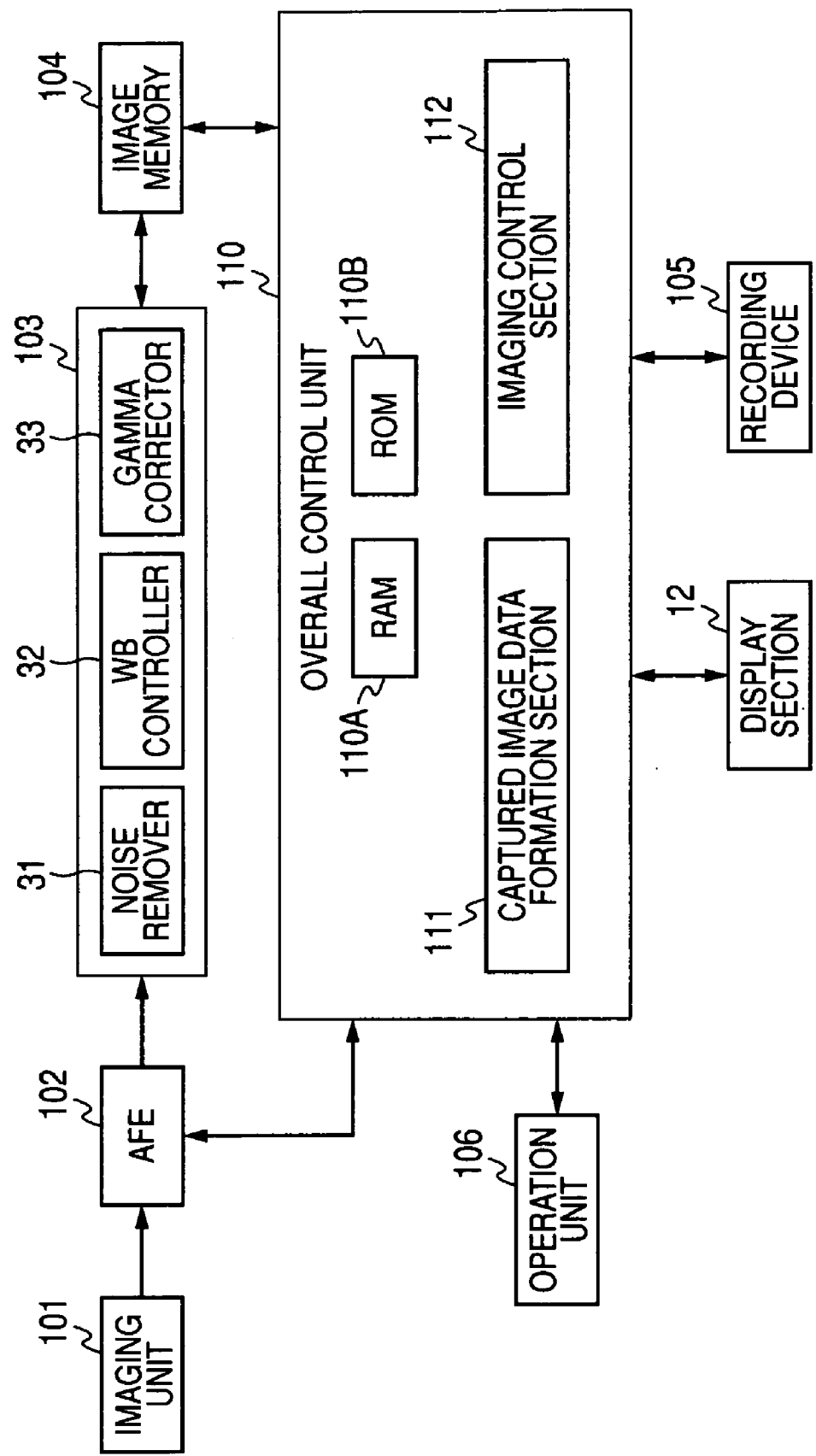
FIG. 4 is a block diagram showing a functional configuration of the imaging apparatus.
Figure 5:
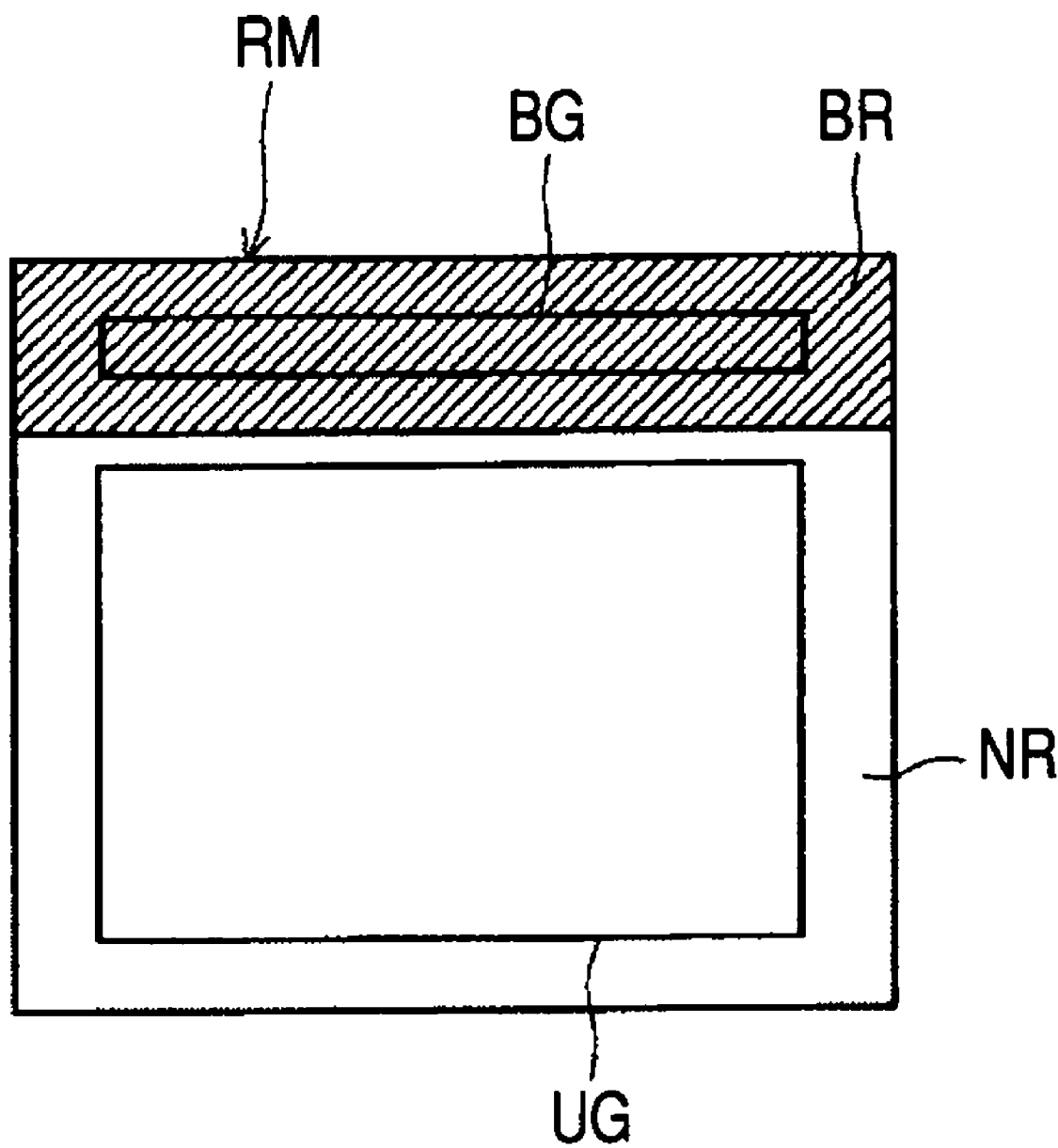
FIG. 5 shows a light receiving plane of an imaging device.

Functions of the imaging apparatus 1A will be summarized below. FIG. 4 is a block diagram showing a functional configuration of the imaging apparatus 1A. FIG. 5 shows a light receiving plane of an imaging device C10.

As shown in FIG. 4, the imaging apparatus 1A includes an imaging unit 101, an AFE (analog front end) 102, an image processing unit 103, an image memory 104, a removable recording device 105, an operation unit 106, and an overall control unit 110.

The operation unit 106 includes a variety of buttons and switches including the release button 11, the mode dial 5 (see FIG. 1), and the menu button 16 (see FIG. 3). In response to user's input operation through the operation unit 106, the overall control unit 110 and other components carry out a variety of actions. For example, when it is detected that the release button 11 is fully pressed, an action of capturing a final captured image is carried out.

The imaging unit 101 includes an optical sensor, such as the imaging device (CCD or CMOS) C10. The imaging device C10 has a plurality of pixels, each of which having a photodiode, arranged in horizontal and vertical directions in a two-dimensional matrix. The plurality of pixels includes pixels UG contained in an effective pixel area NR (also referred to as "effective pixels") capable of receiving light forming an image of a subject (also referred to as "subject light"), and pixels BG contained in an optical black (OPB) area BR (also referred to as "black pixels") incapable of receiving the subject light.

For example, in the imaging device C10 shown in FIG. 5, a central portion of the imaging device C10 is set (defined) as the effective pixel area NR, and an upper portion (upper end portion) of the periphery of the imaging device C10 is set as the optical black area BR. In this description, although the upper end portion of the imaging device C10 is set as the optical black area BR, the optical black area BR is not necessarily set in the upper end portion. The lower end portion, the left end portion, or the right end portion of the imaging device C10 may be set as the optical black area BR.

The effective pixels UG are exposed to the subject light, receive it, and produce image signals (pixel signals) that relate to the subject image. Specifically, R (red), G (green), and B (blue) elementary-color transmitting filters are disposed on light receiving surfaces RM of the effective pixels UG in a checkerboard-like Bayer layout. The effective pixels UG convert the focused optical image of the subject into analog electric signals for R (red), G (green), and B (blue) color components, and produce the image signals.

On the other hand, the black pixels BG have a light blocking member on the pixel surfaces, and the light blocking member blocks the subject light. The black pixels BG produce signals containing noise components resulting from dark current (also referred to as "noise signals") as reference signals for the pixel signals. A noise remover 31, which will be described later, uses the noise signals to remove the noise components contained in the image signals acquired by the effective pixels UG.

The AFE 102 provides timing pulses that cause the imaging device C10 to carry out a predetermined action. The AFE 102 has a function of performing predetermined signal processing on the signal outputted from each of the pixels that form the imaging device C10, converting the signal into a digital signal (also referred to as "digital pixel signal"), and outputting the digital signal to the image processing unit 103.

The digital signal outputted to the image processing unit 103 is temporarily stored in the image memory 104 in synchronization with readout from the imaging device C10. The storing operation to the image memory 104 is carried out until the readout from the imaging device C10 is completed (until the exposure is completed), and after the exposure has been completed, captured image data are formed in the image memory 104.

The image processing unit 103 accesses the captured image data stored in the image memory 104 and performs predetermined signal processing on the captured image data. The image processing unit 103 includes a noise remover 31, a white balance (WB) controller 32, and a gamma corrector 33.

In the noise remover 31, noise generated in the imaging device C10, for example, in extended period exposure in bulb imaging is removed from the image data. Among the noise contained in the image data, the noise remover 31 can particularly remove noise resulting from dark current (also referred to as "dark current noise") in a precise manner. The detail of this operation will be described later.

The white balance controller 32 converts the levels of digital signals for the R (red), G (green), and B (blue) color components (white balance (WB) adjustment) based on a light source's white reference. Specifically, the white balance controller 32 uses brightness data, color data, or other data to identify the portion in the imaged subject that is presumed to be originally white based on WB adjustment data provided from the overall control unit 110, averages R, G, and B color components in that portion, determines a G/R ratio and a G/B ratio, and uses the ratios as R and B correction gains to carry out the level correction.

The gamma corrector 33 corrects grayscale characteristics of the image data that have undergone the WB adjustment. Specifically, the gamma corrector 33 uses a preset gamma correction table to nonlinearly convert the level of the image data for each color component and performs offset adjustment.

The image memory 104 includes a non-volatile memory, and in an imaging mode, temporarily stores the image data outputted from the image processing unit 103. The image memory 104 is also a working area used by the overall control unit 110 to perform a predetermined process on the image data. Further, in a reproducing mode, the image memory 104 temporarily stores image data read from the recording device 105.

The overall control unit 110 is configured as a microcomputer and primarily includes a CPU, a RAM 110A, and a ROM 110B. The overall control unit 110 reads a program stored in the ROM 110B and executes the program in the CPU to perform a variety of functions. A captured image data formation section 111 and an imaging control section 112, indicated as function blocks in FIG. 4, represent functions performed by executing the program in the overall control unit 110.

The captured image data formation section 111 has a function of transferring digital signals successively outputted from the AFE 102 to the image memory 104 through the image processing unit 103 and successively accumulating the digital signals for each common pixel in the image memory 104 to form captured image data. The captured image data formed in the image memory 104 contains image data based on the image signals provided from the effective pixels UG and noise image data based on the noise signals provided from the black pixels BG.

The imaging control section 112 has a function of controlling a variety of imaging actions in a selected imaging mode.

For example, in the bulb imaging, the imaging device C10 is continuously exposed to light (also referred to as "final exposure") as long as it is detected that the release button 11 is fully pressed. Specifically, as long as the fully-pressed state is detected, the shutter remains open, and electric charge is accumulated for an extended period in the imaging device C10. Final captured image data (also referred to as "final exposure data") HE is thus acquired. When it is detected that the fully pressed state is released, imaging is carried out with the shutter closed (also referred to as "dark exposure" or "non-exposure") to acquire captured image data BE formed of noise components resulting from dark current, white defects, or other factors that occur in the imaging device C10 (also referred to as "dark captured image data" or "dark exposure data"). The dark exposure data BE is used in removing noise in image data contained in the final exposure data HE (also referred to as "final image data"), and the dark exposure data BE contains image data provided from the effective pixels UG (also referred to as "dark image data") and noise image data provided from the black pixels BG (also referred to as "dark noise image data"). It is noted that the dark exposure in the present embodiment is carried out for the same period as the final exposure period (specifically, an electric charge accumulation period in the final imaging).

1-3. Noise Removal

Figure 6:
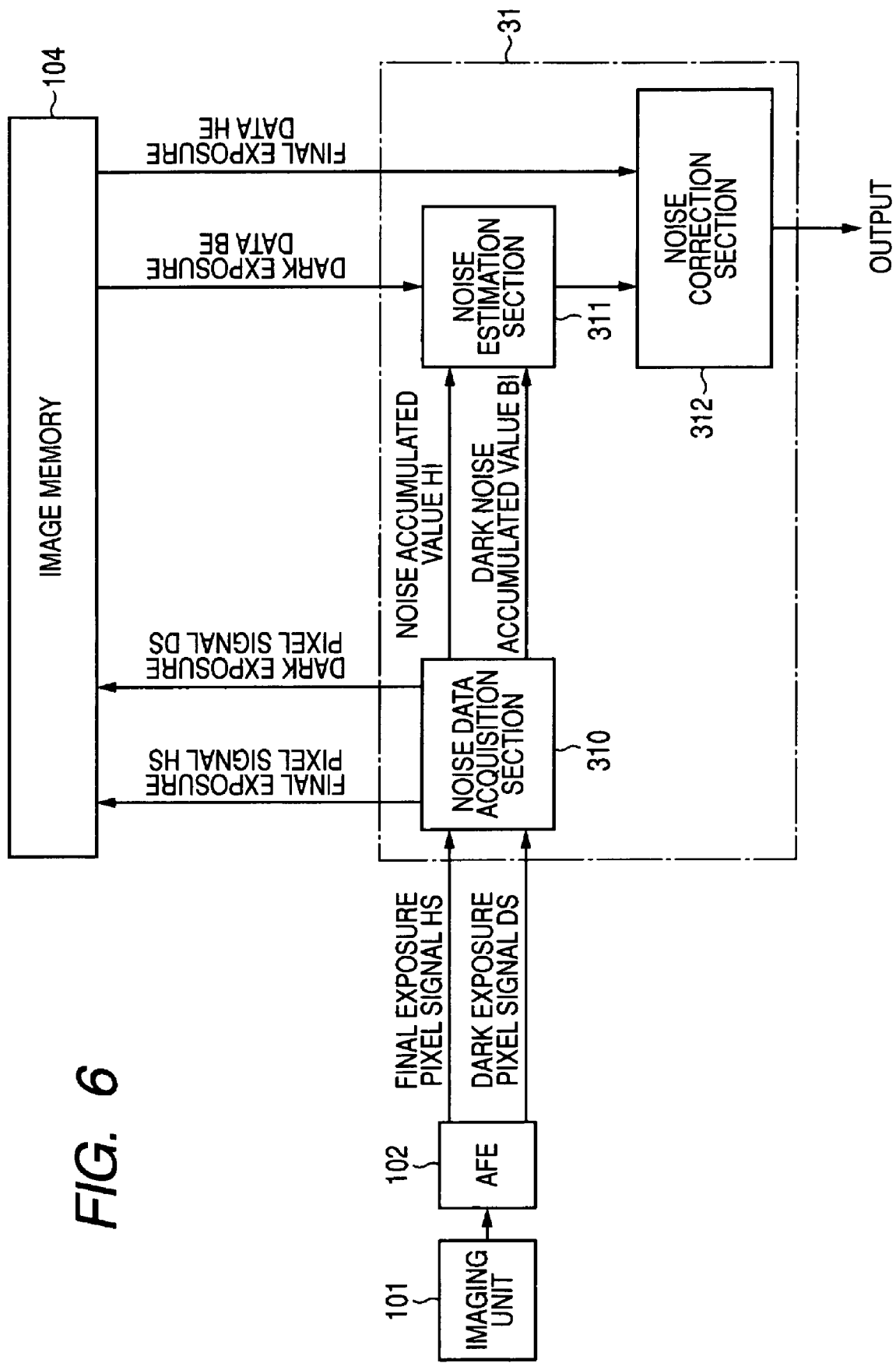
FIG. 6 is a block diagram of noise removal.

Noise removal carried out in the noise remover 31 will be described in detail. FIG. 6 is a block diagram of the noise removal.

As shown in FIG. 6, the noise remover 31 includes an optical black (OPB) detector (also referred to as "noise data acquisition section") 310, a noise estimation section 311, and a noise correction section (also referred to as "noise subtraction section") 312. The noise remover 31 has a function of removing noise from image data acquired in bulb imaging, and in particular has a function of precisely removing dark current noise.

Specifically, the noise data acquisition section 310 successively receives digital pixel signals HS produced by the imaging unit 101 and the AFE 102 in the final exposure (also referred to as "final exposure pixel signals") in synchronization with timing pulses from the AFE 102. The noise data acquisition section 310 successively detects digital signals BNS acquired in the black pixels BG in the final exposure pixel signals HS (also referred to as "final exposure noise signals"), and the final exposure noise signals are accumulated (acquired) as a noise accumulated value (also referred to as "noise data") HI. The noise accumulated value HI is acquired by accumulating all digital signals produced in each of the black pixels BG in the final exposure.

In the dark exposure, the noise data acquisition section 310 successively receives digital pixel signals DS produced by the imaging unit 101 and the AFE 102 (also referred to as "dark exposure pixel signals" or "dark pixel signals") in synchronization with the timing pulses from the AFE 102. The noise data acquisition section 310 successively detects digital signals DNS acquired in the black pixels BG in the dark exposure pixel signals DS (also referred to as "dark noise signals"), and the dark noise signals are accumulated as a dark noise accumulated value (also referred to as "dark noise data") BI. The dark noise accumulated value BI is acquired by successively accumulating the digital signals produced in the black pixels BG in the dark exposure.

When the dark exposure is completed, the noise accumulated value HI and the dark noise accumulated value BI are outputted to the noise estimation section 311 (see FIG. 6).

The final exposure pixel signals HS and the dark exposure pixel signals DS are transferred from the noise data acquisition section 310 to the image memory 104. In the image memory 104, the captured image data formation section 111 forms the final exposure data HE based on the final exposure pixel signals HS and forms the dark exposure data BE based on the dark exposure pixel signals DS.

The noise estimation section 311 reads the dark exposure data BE stored in the image memory 104, and uses the dark exposure data BE as well as the noise accumulated value HI and the dark noise accumulated value BI to estimate a dark current noise component CN contained in the pixel value of each pixel PX in the final image data acquired in the final exposure. Specifically, the dark current noise component CN contained in the pixel value of each pixel PX in the final image data is calculated by multiplying the pixel value of each pixel PX in the dark image data contained in the dark exposure data BE by a noise ratio of the noise accumulated value HI to the dark noise accumulated value BI.

The noise correction section 312 reads the final exposure data HE stored in the image memory 104, and carries out final image data correction in which the dark current noise component CN is removed from the pixel value of each pixel PX in the final image data contained in the final exposure data HE.

Figure 7:
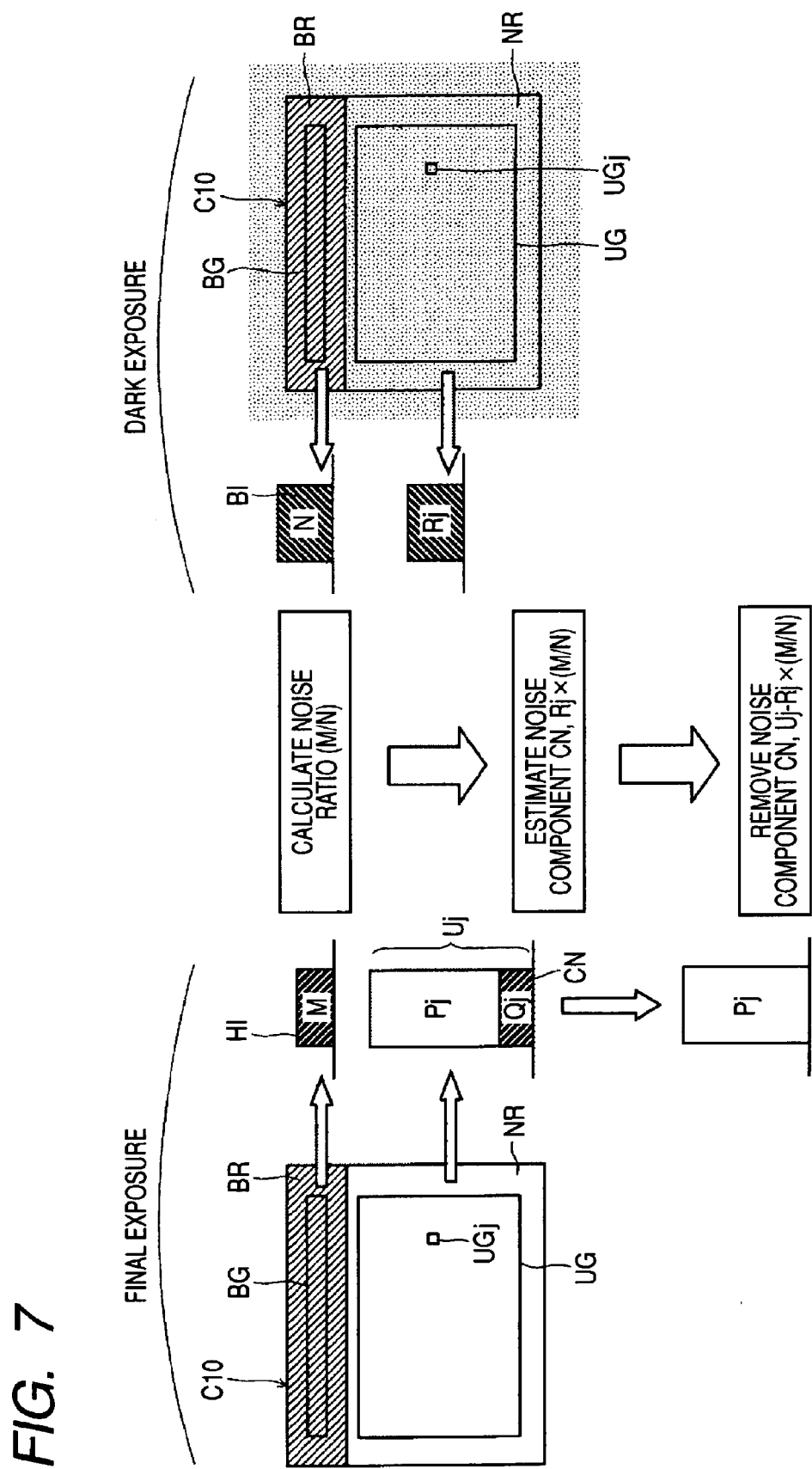
FIG. 7 is a schematic diagram of the noise removal in a first embodiment.

A description will now be made of the noise removal in which dark current noise is removed from the pixel value acquired by an effective pixel UGj (j represents the i-th pixel) in the effective pixel area NR in the final exposure with reference to FIG. 7. FIG. 7 is a schematic diagram of the noise removal.

In FIG. 7, in the final exposure, a pixel value (Uj) containing a noise component CN (Qj) and an image component (Pj) is acquired from the effective pixel UGj, and the noise data acquisition section 310 acquires the noise accumulated value HI (M) from the black pixels BG. Similarly, in the dark exposure, a noise component pixel value (Rj) is acquired from the effective pixel UGj, and the noise data acquisition section 310 acquires the dark noise accumulated value BI (N) from the black pixels BG. The pixel value (Uj) acquired from the effective pixel UGj in the final exposure is the pixel value of a pixel that forms the final image data stored in the image memory 104 (specifically, a pixel PXj that corresponds to the effective pixel UGj), and the pixel value (Rj) acquired from the effective pixel UGj in the dark exposure is the pixel value of a pixel that forms the dark image data stored in the image memory 104 (specifically, a pixel DXj that corresponds to the effective pixel UGj).

To remove dark current noise from the pixel value (Uj) acquired by the effective pixel UGj, the following operations are carried out: The noise estimation section 311 calculates the noise ratio (M/N) of the noise accumulated value HI (M) to the dark noise accumulated value BI (N). The noise ratio (M/N) is then multiplied by the pixel value (Rj) of the pixel DXj in the dark image data to provide an estimated value (Rj×M/N) of the noise component CN (Qj) contained in the pixel value (Uj) of each pixel PXj in the final image data.

The noise correction section 312 then subtracts the noise component estimated value (Rj×M/N) from the pixel value (Uj) of the pixel PXj in the final image data. The pixel value (Pj) without the noise component CN (Qj) is thus acquired.

As described above, in the noise removal carried out in the noise remover 31, the noise accumulated value HI (M), the dark noise accumulated value BI (N), and the pixel value (Rj) of each pixel DXj in the dark image data are used to execute the operation expressed in the expression (1) for each pixel PXj that forms the final image data so as to provide the pixel value (Pj) obtained by removing the dark current noise component CN (Qj) from the pixel value (Uj) of each pixel PXj in the final image data.

$$Pj = Uj - Rj \times \frac{M}{N} \quad (1)$$

In the present embodiment, the noise component CN in the final image data is estimated by multiplying the noise ratio (M/N) of the noise accumulated value HI (M) to the dark noise accumulated value BI (N) by each pixel value in the dark image data in the noise estimation section 311 under the fact that the rate of change (percentage of change) in dark current noise with respect to the temperature TC of the imaging device C10 is substantially the same in each pixel in the imaging device C10. The principle of estimating the noise component CN in the final image data will be described below in detail.

Figure 8:
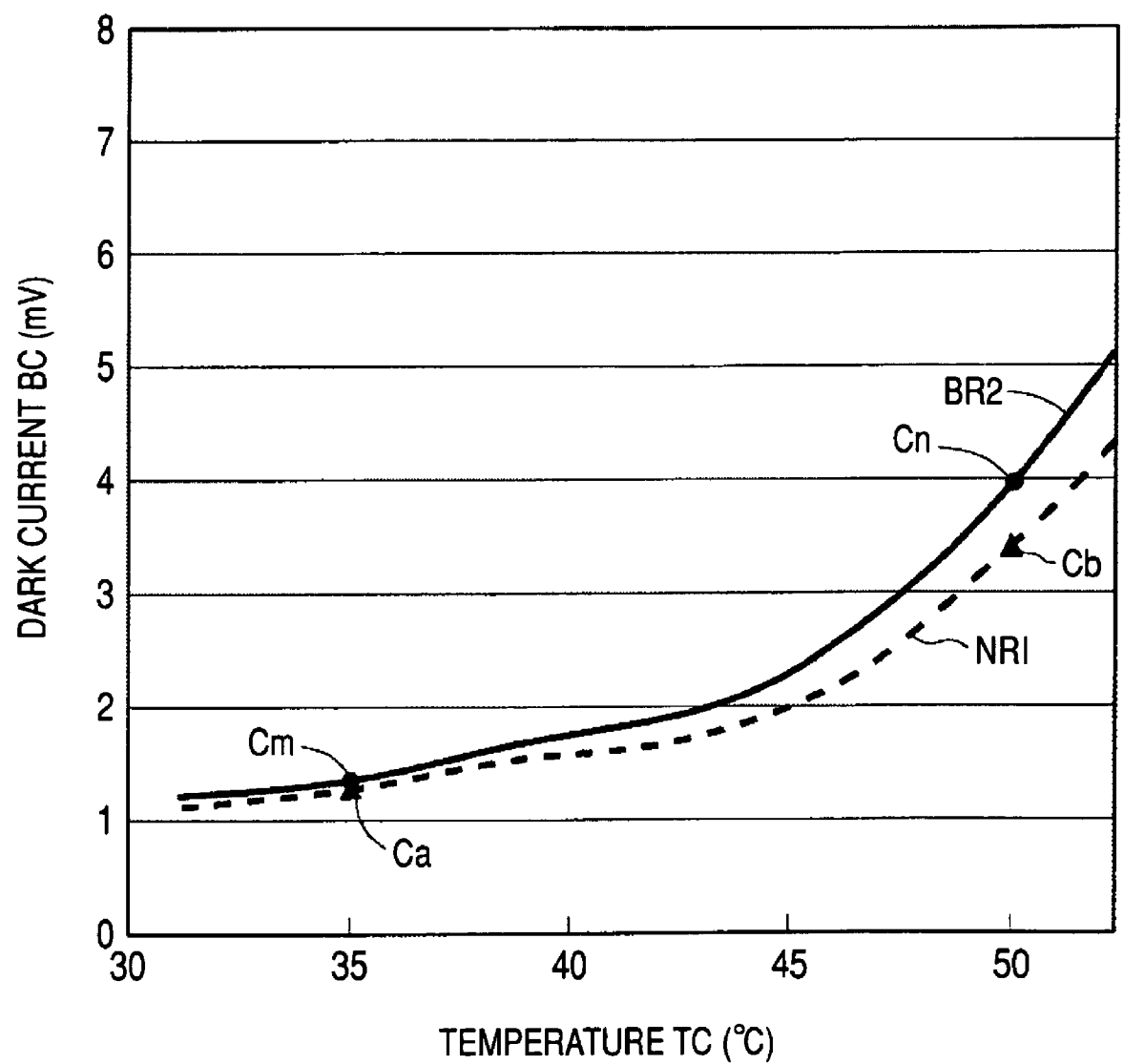
FIG. 8 shows the change in dark current with respect to the temperature of the imaging device.

FIG. 8 shows the change in dark current with respect to the temperature TC of the imaging device C10. In FIG. 8, the broken-line graph NR1 represents how dark current BC1 generated in an effective pixel UG1 in the effective pixel area NR changes, and the solid-line graph BR2 represents how dark current BC2 generated in a black pixel BG2 in the optical black area BR changes.

Since the imaging device C10 generates heat when driven, the temperature TC of the imaging device C10 increases when imaging is carried out for a long period. As shown in FIG. 8, when the temperature TC of the imaging device C10 increases, the dark current BC generated in the imaging device C10 increases.

The rate of increase in the dark current BC due to the increase in temperature of the imaging device C10 is substantially the same in each pixel in the imaging device C10. Specifically, the rate of change in the dark current BC1 generated in the effective pixel UG1 in the effective pixel area NR with respect to the temperature TC of the imaging device C10 is substantially the same as the rate of change in the dark current BC2 generated in the black pixel BG2 in the optical black area BR with respect to the temperature TC of the imaging device C10.

For example, in FIG. 8, when the temperature TC of the imaging device C10 is approximately 35 (° C.), the amount of the dark current BC1 (Ca) in the effective pixel UG1 is approximately 1.3 (mV), and the amount of the dark current BC2 (Cm) in the black pixel BG2 is approximately 1.4 (mV). When the temperature TC of the imaging device C10 becomes approximately 50 (° C.), however, the amount of the dark current BC1 (Cb) in the effective pixel UG1 becomes approximately 3.4 (mV), and the amount of the dark current BC2 (Cn) in the black pixel BG2 becomes approximately 4.0 (mV). That is, the rate of change in the dark current BC1 in the effective pixel UG1 (Cb/Ca) is approximately 2.6, and the rate of change in the dark current BC2 in the black pixel BG2 (Cn/Cm) is approximately 2.9. Therefore, the rate of change in dark current in the effective pixel UG1 is substantially the same as that in the black pixel BG2, and the relationship expressed in the expression (2) is satisfied.

$$Cb/Ca \approx Cn/Cm \qquad (2)$$

The expression (2) can be rewritten into the expression (3). The right-hand side of the expression (3) (Cm/Cn) represents a dark current ratio of the dark current generated in the black pixel BG2 in the final exposure to the dark current generated in the black pixel BG2 in the dark exposure (also referred to as "black dark current ratio"). The black dark current ratio (Cm/Cn) is equivalent to the ratio of dark current noise generated in the black pixel BG2 in the final exposure to dark current noise generated in the black pixel BG2 in the dark exposure, and equal to the noise ratio (M/N) of the noise accumulated value HI (M) to the dark noise accumulated value BI (N) in the expression (1).

$$Ca/Cb \approx Cm/Cn \qquad (3)$$

On the other hand, the left-hand side of the expression (3) (Ca/Cb) represents the dark current ratio of the dark current generated in the effective pixel UG1 in the final exposure to the dark current generated in the effective pixel UG1 in the dark exposure. The black dark current ratio (Ca/Cb) is equivalent to the ratio of dark current noise generated in the effective pixel UG1 in the final exposure to dark current noise generated in the effective pixel UG1 in the dark exposure.

Since the expression (3) is an equality, the dark current noise generated in the effective pixel UG1 in the final exposure is calculated by multiplying the dark current noise generated in the effective pixel UG1 in the dark exposure by the black dark current ratio (Cm/Cn). That is, an estimated value of the noise component CN contained in the pixel PXj in the final image data is calculated by multiplying the pixel value (Rj) of each pixel in the dark image data provided from the effective pixel UG1 in the dark exposure by the noise ratio (M/N).

1-4. Actions

Figure 9:
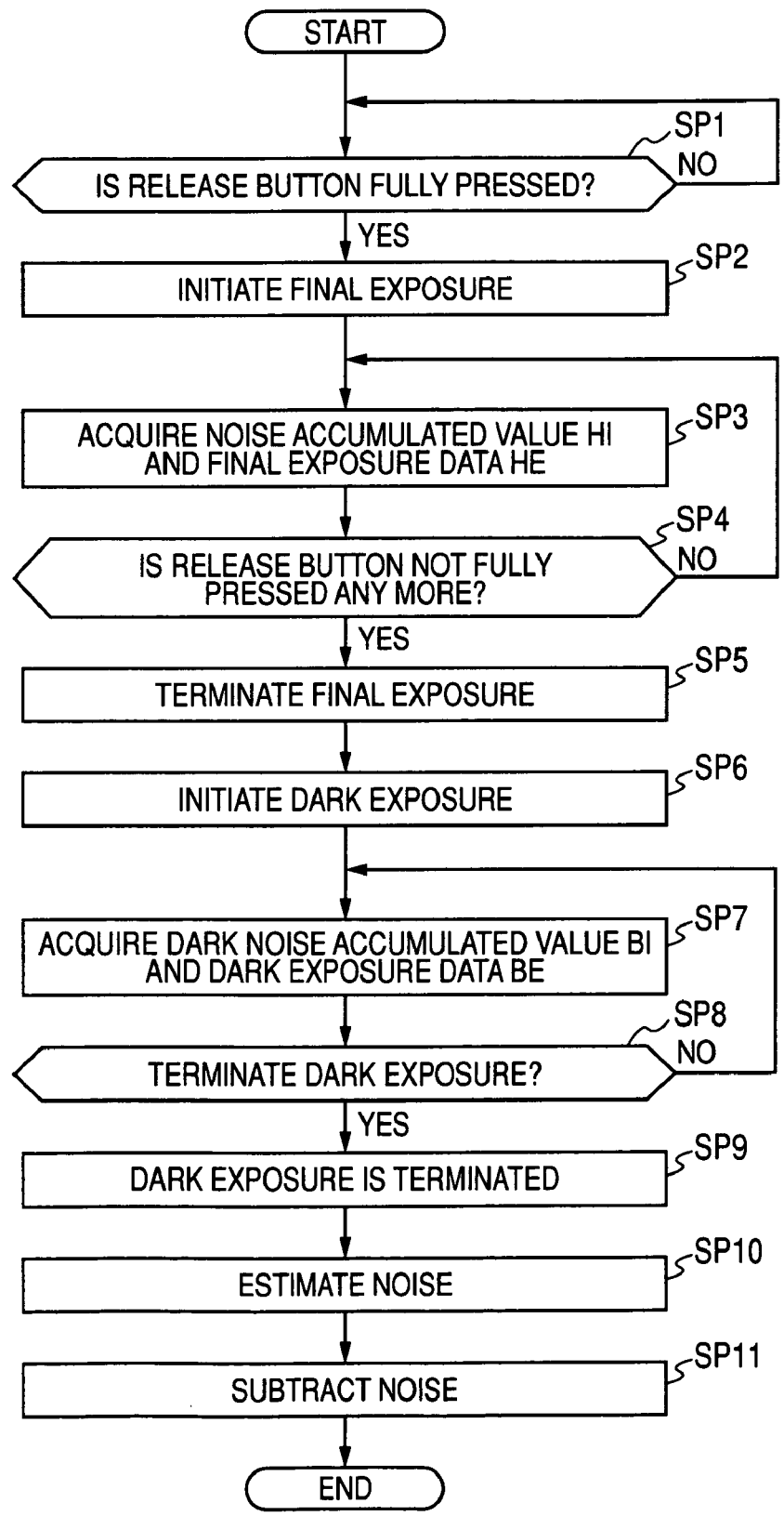
FIG. 9 is a flowchart of actions in bulb imaging.

Now, in the imaging apparatus 1A, a description will be made of the actions of the imaging apparatus 1A when an imaging mode for bulb imaging is selected. FIG. 9 is a flow-chart of the actions of the imaging apparatus 1A in the bulb imaging.

As shown in FIG. 9, first, it is detected in the step SP1 whether or not the release button 11 is fully pressed. When the fully-pressed state is not detected, the control waits until the fully-pressed state is detected, whereas when the fully-pressed state is detected, the control proceeds to the step SP2.

In the step SP2, the final exposure is initiated. Specifically, the imaging device C10 is irradiated with light from a subject, and each of the pixels that form the imaging device C10 produces a pixel signal.

In the step SP3, the noise data acquisition section 310 carries out accumulation to produce the noise accumulated value HI, and the captured image data formation section 111 forms the final exposure data HE in the image memory 104.

In the step SP4, it is detected whether or not the release button 11 is not fully pressed any more. When it is not detected that the fully-pressed state is released, the control returns to the step SP3, and the final exposure continues. When it is detected that the fully-pressed state is released, the control proceeds to the step SP5, and the final exposure is terminated.

In the step SP6, the dark exposure is initiated. Specifically, imaging with the shutter closed (dark exposure) is initiated, and each of the pixels in the imaging device C10 produces a dark current noise pixel signal.

In the step SP7, the noise data acquisition section 310 carries out accumulation to provide the dark noise accumulated value BI, and the captured image data formation section 111 forms the dark exposure data BE in the image memory 104.

In the step SP8, it is judged whether or not to terminate the dark exposure. In the imaging apparatus 1A, it is judged whether or not the dark exposure is carried out for the same period as the final exposure period. When it is judged not to terminate the dark exposure, the control returns to the step SP7, and the dark exposure continues. On the other hand, when it is judged to terminate the dark exposure, the control proceeds to the step SP9, and the dark exposure is terminated.

In the step SP10, the noise estimation section 311 estimates the dark current noise component CN contained in the pixel value of each pixel PX in the final image data.

In the step SP11, the noise correction section 312 subtracts the dark current noise component CN from the pixel value of each pixel PX in the final image data, and the final image data from which the noise component CN is removed is acquired.

As described above, in the imaging apparatus 1A, the noise ratio of the dark current noise generated in the final exposure to the dark current noise generated in the dark exposure is calculated, and the noise ratio along with the dark current noise generated in each effective pixel UG in the dark exposure is used to acquire dark current noise that is presumably generated in each effective pixel UG in the final exposure.

In this way, even when an extended exposure is carried out, so that dark current noise increases due to increase in temperature resulting from heat generated in the imaging device C10, and the amount of dark current noise contained in the final image data acquired in the final exposure and the amount of dark current noise contained in the image data acquired in the dark exposure change, the dark current noise contained in the final image data can be precisely estimated, whereby the dark current noise contained in the final image data can be precisely removed.

2. Second Embodiment

Figure 10:
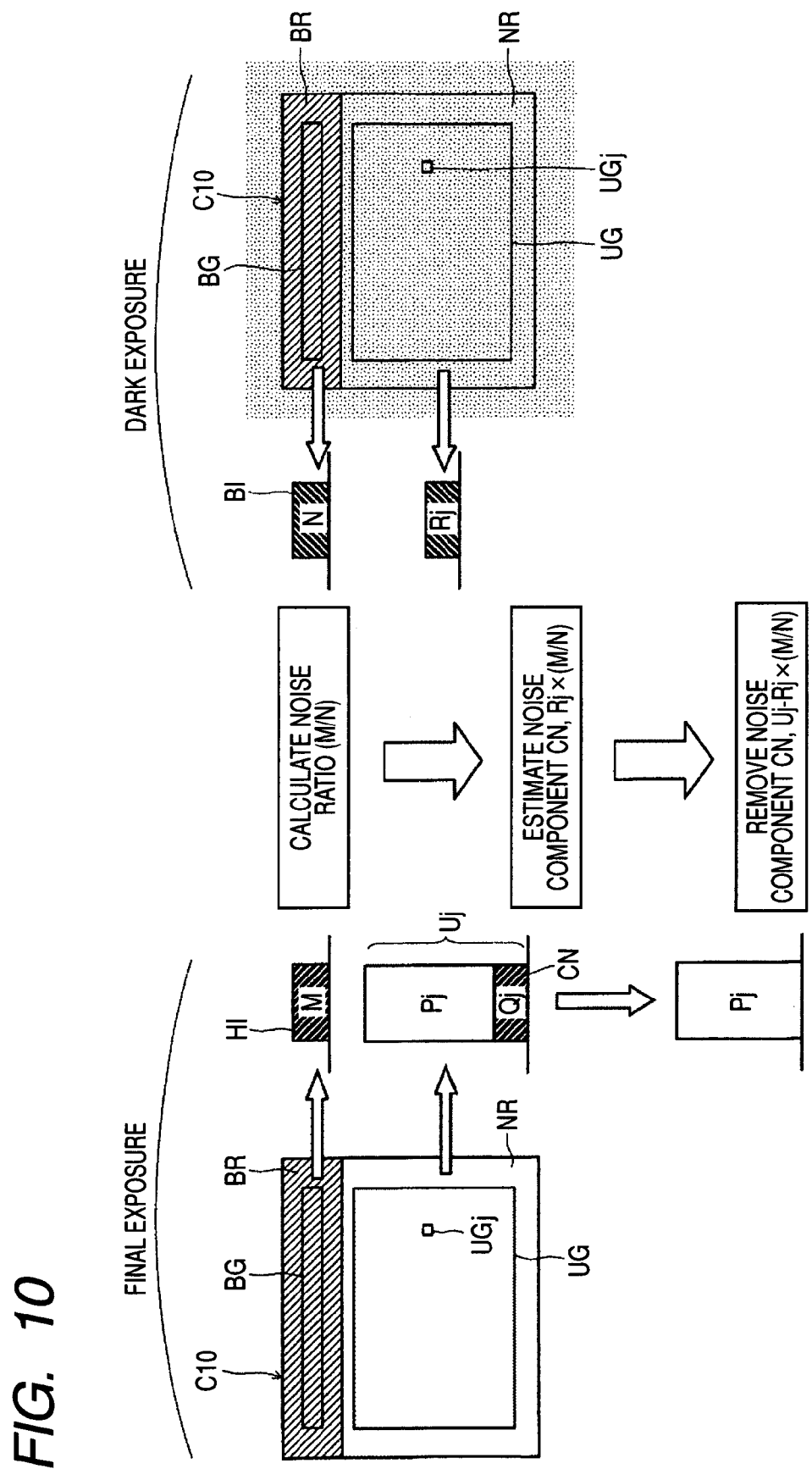
FIG. 10 is a schematic diagram of noise removal in a second embodiment.

A second embodiment of the invention will be described. In an imaging apparatus 1B according to the second embodiment, in an extended exposure, the period in which dark exposure is carried out (dark exposure period) is set to be shorter (a shorter period) than the final exposure period. FIG. 10 is a schematic diagram of noise removal carried out in the imaging apparatus 1B.

The imaging apparatus 1B according to the second embodiment has the same configuration and functions as those of the imaging apparatus 1A according to the first embodiment (see FIGS. 1 to 6) except that the dark exposure period in extended exposure imaging is shorter than the final exposure period. The common portions have the same reference characters and description thereof will be omitted.

As shown in FIG. 10, since the dark exposure period is set to a smaller value, the dark noise accumulated value BI (N) acquired by the noise data acquisition section 310 and the pixel value (Rj) of each pixel DXj in the dark image data formed in the image memory 104 in the dark exposure decrease in size.

However, since the rate of change in the dark current BC1 generated in the effective pixel UG1 with respect to the temperature of the imaging device C10 is substantially the same as the rate of change in the dark current BC2 generated in the black pixel BG2 with respect to the temperature of the imaging device C10, and the noise estimation section 311 in the imaging apparatus 1B estimates the noise component CN based on the ratio of dark current noise generated in the black pixel BG2 in the final exposure to that in the dark exposure, the dark current noise contained in the final image data can also be precisely removed in the imaging apparatus 1B by carrying out the same processes carried out in the noise remover 31 in the imaging apparatus 1A.

That is, in the imaging apparatus 1B, the noise accumulated value HI (M), the dark noise accumulated value BI (N), and the pixel value (Rj) of each pixel DXj in the dark image data are used to execute the operation expressed in the expression (1) for each pixel PXj that forms the final image data so as to remove the noise component CN (Qj) contained in the pixel value (Uj) of each pixel PXj in the final image data.

As described above, even when the dark exposure is not carried out for the same period as that of the final exposure, the noise component contained in the final image data can be precisely removed by calculating the noise ratio of the dark current noise generated in the final exposure to the dark current noise generated in the dark exposure and using the noise ratio along with the dark image data to estimate the noise component contained in the final image data. That is, in the imaging apparatus 1B, the dark exposure period can be shorter than the final exposure period, whereby the period necessary for extended exposure imaging (total imaging period) can be reduced.

3. Third Embodiment

Figure 11:
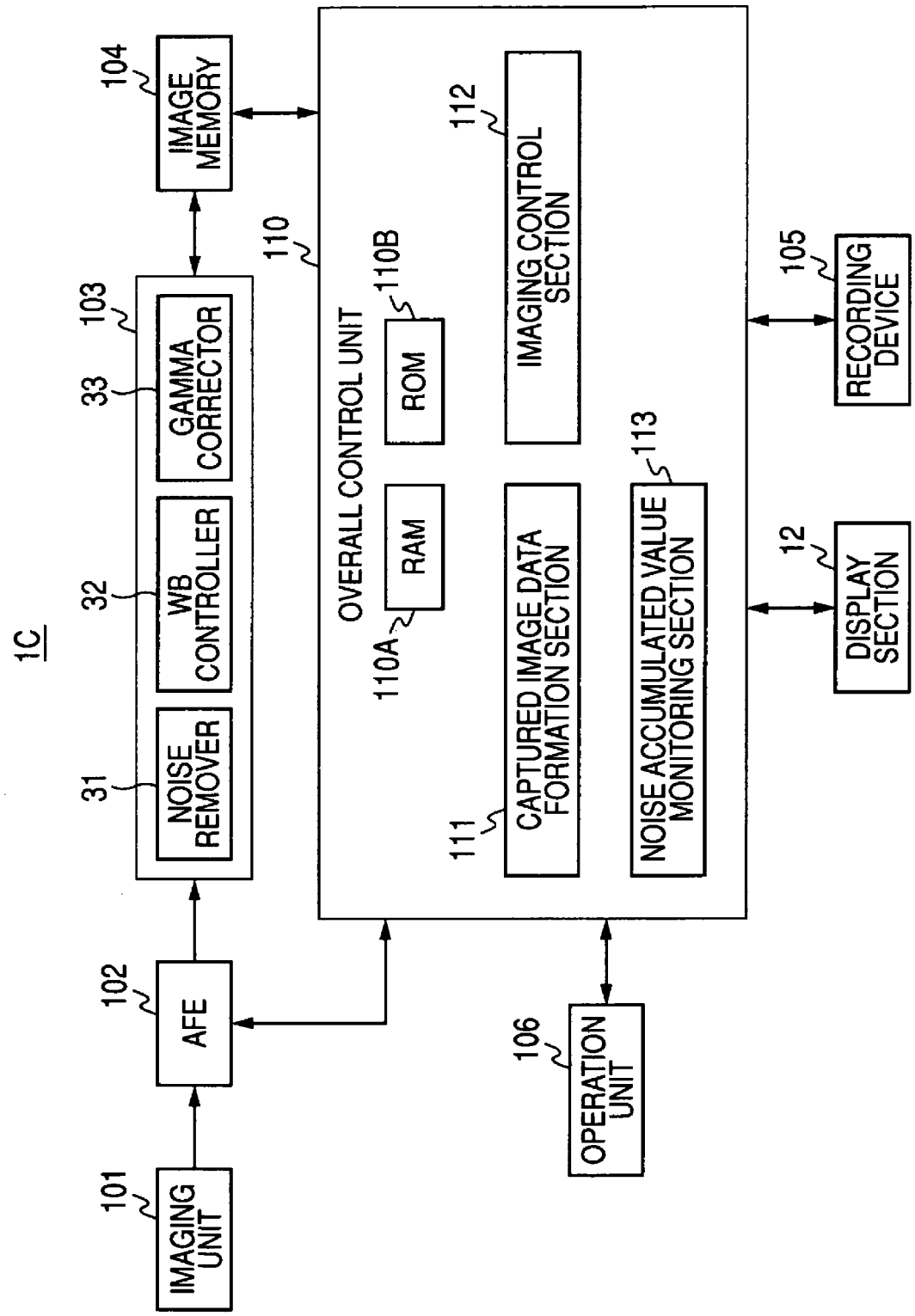
FIG. 11 is a block diagram showing a functional configuration of an imaging apparatus according to a third embodiment.
Figure 12:
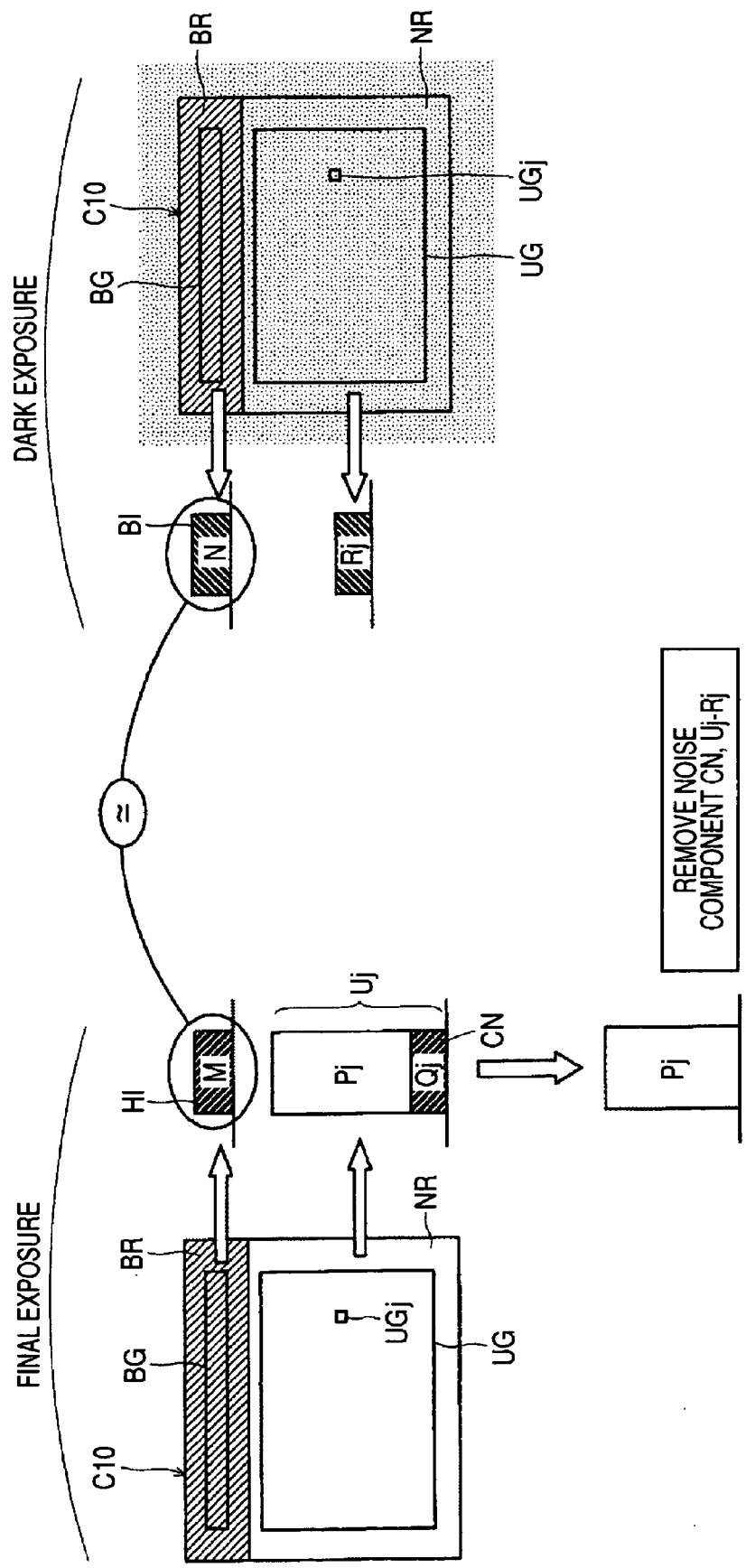
FIG. 12 is a schematic diagram of noise removal in a third embodiment.

A third embodiment of the invention will be described. In an imaging apparatus 1C according to the third embodiment, the noise data acquisition section 310 monitors the dark noise accumulated value BI acquired in the dark exposure, and the dark exposure is terminated when the data amount of the dark noise accumulated value BI becomes substantially the same as that of the noise accumulated value HI. FIG. 11 is a block diagram showing a functional configuration of the imaging apparatus 1C. FIG. 12 is a schematic diagram of noise removal carried out in the imaging apparatus 1C.

The imaging apparatus 1C according to the third embodiment has the same configuration and functions as those of the imaging apparatus 1A according to the first embodiment (see FIGS. 1 to 3, FIGS. 5 and 6) except that the dark noise accumulated value BI is monitored and the dark exposure is terminated when the dark noise accumulated value BI becomes substantially the same as the noise accumulated value HI. The common portions have the same reference characters and description thereof will be omitted.

As shown in FIG. 11, the imaging apparatus 1C further includes a noise accumulated value monitoring section 113 as a function performed in the overall control unit 110.

The noise accumulated value monitoring section 113 has a function of monitoring the dark noise accumulated value BI successively accumulated in the noise data acquisition section 310 and instructing the imaging control section 112 to terminate the dark exposure when the dark noise accumulated value BI becomes substantially the same as the noise accumulated value HI.

Specifically, as shown in FIG. 12, the noise data acquisition section 310 acquires the noise accumulated value HI (M) in the final exposure, and then in the dark exposure, successively acquires the dark noise accumulated value BI (N), which is monitored by the noise accumulated value monitoring section 113. The dark noise signals DNS are then successively accumulated, and the imaging control section 112 terminates the dark exposure when the dark noise accumulated value BI (N) becomes substantially the same as the noise accumulated value HI (M).

Whether or not the dark noise accumulated value BI becomes substantially the same as the noise accumulated value HI may be judged, for example, in the following way: The dark noise accumulated value BI (N) becomes substantially the same as the noise accumulated value HI (M) when it is detected that the dark noise accumulated value BI (N) becomes larger or equal to the noise accumulated value HI (M).

When the dark exposure is completed, the noise estimation section 311 and the noise correction section 312 carry out noise removal. Since the noise ratio (M/N) of the noise accumulated value HI (M) to the dark noise accumulated value BI (N) is "1" and hence the expression (1) described above is written into the expression (4), the noise estimation section 311 and the noise correction section 312 carry out in effect the operation expressed in the expression (4). More specifically, the dark current noise component CN (Qj) is removed from the pixel value (Uj) of each pixel PXj in the final image data by subtracting the pixel value (Rj) of each pixel DXj in the dark image data from the corresponding pixel value (Uj) of each pixel PXj that forms the final image data.

$$Pj = Uj - Rj \quad (4)$$

As described above, in the imaging apparatus 1C, since the dark noise accumulated value BI obtained in the successive accumulation process is monitored and the dark exposure is terminated when the dark noise accumulated value BI becomes substantially the same as the noise accumulated value HI, the dark exposure period can be reduced. Specifically, since the temperature of the imaging device C10 increases when the imaging device C10 is driven for a long period and hence dark current noise increases, it is expected that dark current noise larger than dark current noise generated in the final exposure is generated in the dark exposure in which the temperature of the imaging device C10 is higher than that in the final exposure. It is therefore conceivable that the dark noise accumulated value BI acquired in the dark exposure becomes equal to the noise accumulated value HI acquired in a relatively short period in the final exposure. That is, in the imaging apparatus 1C, the dark exposure period can be shorter than the final exposure period.

Further, in the imaging apparatus 1C, since the noise removal operation can be simplified into subtraction of pixels in the final image data from those in the dark image data, the operation time necessary for the noise removal can be reduced.

4. Fourth Embodiment

Figure 13:
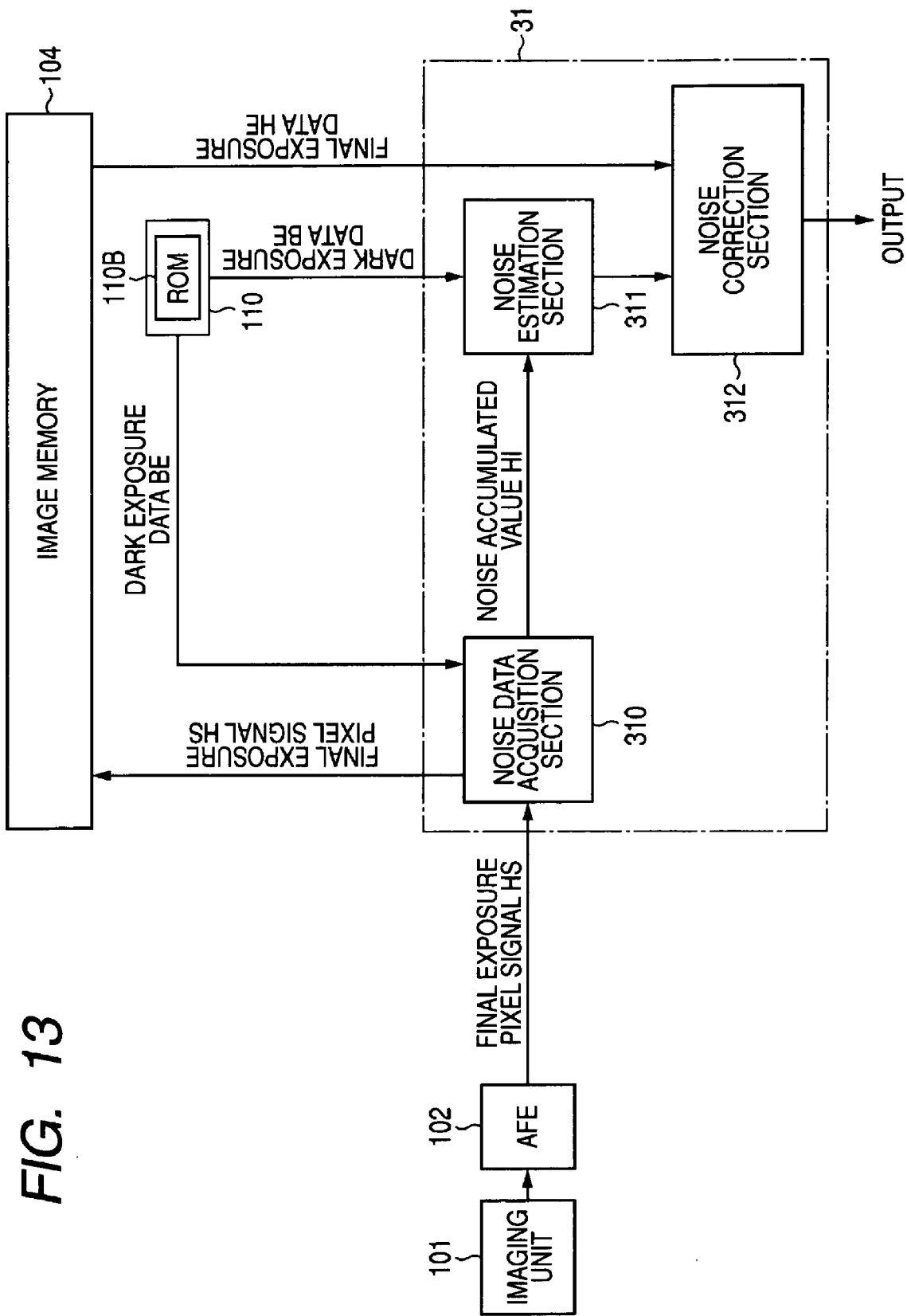
FIG. 13 is a block diagram of noise removal.
Figure 14:
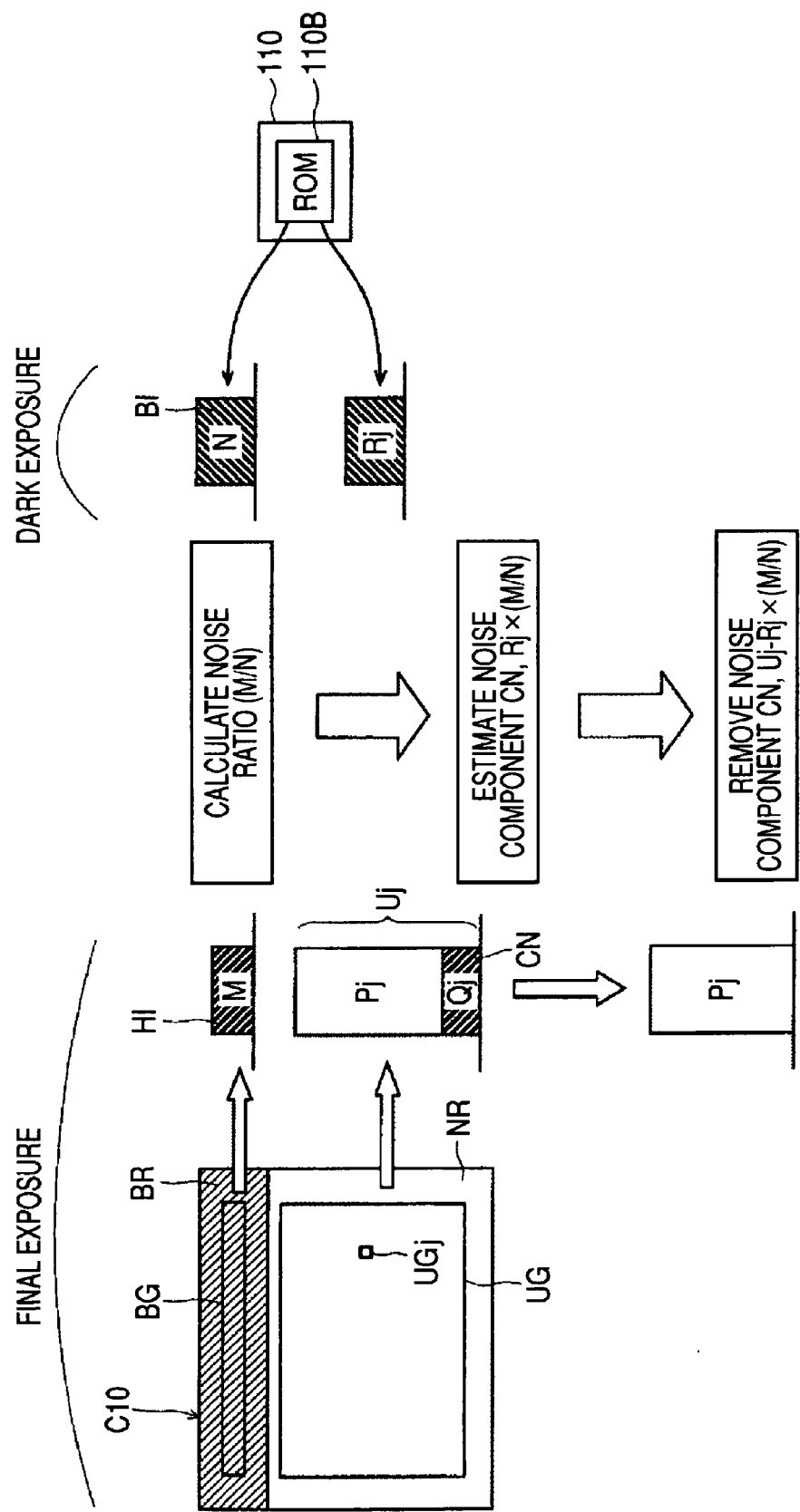
FIG. 14 is a schematic diagram of the noise removal in a fourth embodiment.

A fourth embodiment of the invention will be described. In an imaging apparatus 1D according to the fourth embodiment, the dark exposure data BE acquired in the dark exposure is acquired in advance before extended period exposure. FIG. 13 is a block diagram of noise removal. FIG. 14 is a schematic diagram of the noise removal carried out in the imaging apparatus 1D.

The imaging apparatus 1D according to the fourth embodiment has the same configuration and functions as those of the imaging apparatus 1A according to the first embodiment (see FIGS. 1 to 6) except that the dark exposure data BE is acquired in advance before extended period exposure. The common portions have the same reference characters and description thereof will be omitted.

As described above, in the imaging apparatus 1D, the dark exposure is carried out before extended period exposure, so that the dark exposure data BE (specifically, dark image data and dark noise image data) are acquired in advance, and the dark exposure data BE are stored in the ROM 110B in the overall control unit 110.

As shown in FIG. 13, in the extended period exposure, the noise data acquisition section 310 acquires the noise accumulated value HI in the final exposure and the dark noise accumulated value BI is acquired from the dark exposure data BE read from the ROM 110B. In the imaging apparatus 1D, no dark exposure after the final exposure is carried out.

The noise estimation section 311 reads the dark exposure data BE stored in the ROM 110B, and uses the dark exposure data BE and the noise accumulated value HI to estimate the dark current noise component CN contained in each pixel PX in the final image data acquired in the final exposure. Specifically, as shown in FIG. 14, the noise ratio (M/N) of the noise accumulated value HI (M) to the dark noise accumulated value BI (N) is calculated, and the pixel value (Rj) of each pixel DXj in the dark image data is then multiplied by the noise ratio (M/N) to provide an estimated value (Rj×M/N) of the noise component CN contained in each pixel PXj in the final image data.

The noise correction section 312 reads the final exposure data HE stored in the image memory 104. The estimated value (Rj×M/N) of the noise component is subtracted from the pixel value (Uj) of each pixel PXj in the final image data contained in the final exposure data HE to provide the pixel value (Pj) from without the noise component CN (Qj) (see FIGS. 13 and 14).

In the imaging apparatus 1D, since the dark exposure data BE has been thus acquired in advance, the dark exposure in extended exposure imaging can be omitted, and hence the total imaging period can be reduced.

The dark exposure data BE may be acquired just before the imaging apparatus 1D is shipped, or may be acquired in dark exposure carried out in response to an instruction from the user before extended period exposure.

5. Variation

The embodiments of the invention have been described, but the invention is not limited those described above.

For example, in the first embodiment described above, the digital pixel signals produced by the imaging unit 101 and the AFE 102 (specifically, the final exposure pixel signals HS and the dark exposure pixel signals DS) are inputted to the noise data acquisition section 310 in synchronization with the timing pulses from the AFE 102 and then transferred to the image memory 104, but the invention is not limited thereto. FIG. 15 is a block diagram of noise removal performed in an imaging apparatus 1E according to a variation.

Specifically, as shown in FIG. 15, the digital pixel signals may be directly transferred to the image memory 104. In this way, in the image memory 104, the final exposure data HE is formed based on the final exposure pixel signals HS, and the dark exposure data BE is formed based on the dark exposure pixel signals DS.

The noise data acquisition section 310 then reads the final exposure data HE and acquires the noise accumulated value HI, as well as reading the dark exposure data BE and acquiring the dark noise accumulated value BI.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an imaging device including first pixels capable of receiving light from a subject and second pixels incapable of receiving the subject light;
imaging control means for carrying out a first imaging action in an exposure period during which the imaging device is exposed to light and carrying out a second imaging action in a non-exposure period during which the imaging device is not exposed to light;
storage means for storing first image data acquired from the first pixels in the first imaging action and second image data acquired from the first pixels in the second imaging action;
noise data acquisition means for acquiring first noise data based on pixel signals produced in the second pixels in the first imaging action and acquiring second noise data based on pixel signals produced in the second pixels in the second imaging action;
noise estimation means for estimating a noise component contained in the first image data by using the second image data and a noise ratio of the noise generated in the exposure period to the noise generated in the non-exposure period, the noise ratio calculated by using the first noise data and the second noise data;
noise correction means for removing the noise component from the first image data; and
monitoring means for monitoring the amount of the second noise data,
wherein the imaging control means initiates the second imaging action after the first imaging action is completed and terminates the second imaging action when the amount of the second noise data becomes substantially the same as the amount of the first noise data.

2. The imaging apparatus according to claim 1,
wherein the imaging control means carries out the second imaging action in the non-exposure period set to be shorter than the exposure period after the first imaging action is completed.

3. The imaging apparatus according to claim 1,
wherein the second pixels are pixels in an optical black area that blocks the subject light.

4. An imaging apparatus comprising:
an imaging device including first pixels capable of receiving light from a subject and second pixels incapable of receiving the subject light;
imaging control means for carrying out a first imaging action in an exposure period during which the imaging device is exposed to light and carrying out a second imaging action in a non-exposure period during which the imaging device is not exposed to light;
storage means for storing first image data acquired from the first pixels in the first imaging action and second image data acquired from the first pixels in the second imaging action;
noise data acquisition means for acquiring first noise data based on pixel signals produced in the second pixels in the first imaging action and acquiring second noise data based on pixel signals produced in the second pixels in the second imaging action;
monitoring means for monitoring the amount of the second noise data; and
noise correction means for removing a noise component from the first image data,
wherein the imaging control means initiates the second imaging action after the first imaging action is completed and terminates the second imaging action when the amount of the second noise data becomes substantially the same as the amount of the first noise data, and
the noise correction means removes the noise component by subtracting the second image data from the first image data.

5. An imaging apparatus comprising:
an imaging device including first pixels capable of receiving light from a subject and second pixels incapable of receiving the subject light;
imaging control means for carrying out a first imaging action in an exposure period during which the imaging device is exposed to light and carrying out a second imaging action in a non-exposure period during which the imaging device is not exposed to light;
first storage means for storing first image data acquired from the first pixels in the first imaging action;
second storage means for storing second image data acquired from the first pixels in the second imaging action and noise image data acquired from the second pixels in the second imaging action;
noise data acquisition means for acquiring first noise data based on pixel signals produced in the second pixels in the first imaging action and acquiring second noise data based on the noise image data;
noise estimation means for estimating a noise component contained in the first image data by using the second image data and a noise ratio of the noise generated in the exposure period to the noise generated in the non-exposure period, the noise ratio calculated by using the first noise data and the second noise data;
noise correction means for removing the noise component from the first image data; and
monitoring means for monitoring the amount of the second noise data,
wherein the imaging control means initiates the second imaging action after the first imaging action is completed and terminates the second imaging action when the amount of the second noise data becomes substantially the same as the amount of the first noise data.

6. An imaging apparatus comprising:
an imaging device including first pixels capable of receiving light from a subject and second pixels incapable of receiving the subject light;
an imaging control section carrying out a first imaging action in an exposure period during which the imaging device is exposed to light and carrying out a second imaging action in a non-exposure period during which the imaging device is not exposed to light;
a storage section storing first image data acquired from the first pixels in the first imaging action and second image data acquired from the first pixels in the second imaging action;
a noise data acquisition section acquiring first noise data based on pixel signals produced in the second pixels in the first imaging action and acquiring second noise data based on pixel signals produced in the second pixels in the second imaging action;
a noise estimation section estimating a noise component contained in the first image data by using the second image data and a noise ratio of the noise generated in the exposure period to the noise generated in the non-exposure period, the noise ratio calculated by using the first noise data and the second noise data;
a noise correction section removing the noise component from the first image data; and
a monitoring section monitoring the amount of the second noise data;
wherein the imaging control section initiates the second imaging action after the first imaging action is completed and terminates the second imaging action when the amount of the second noise data becomes substantially the same as the amount of the first noise data.

7. An imaging apparatus comprising:
an imaging device including first pixels capable of receiving light from a subject and second pixels incapable of receiving the subject light;
an imaging control section carrying out a first imaging action in an exposure period during which the imaging device is exposed to light and carrying out a second imaging action in a non-exposure period during which the imaging device is not exposed to light;
a storage section storing first image data acquired from the first pixels in the first imaging action and second image data acquired from the first pixels in the second imaging action;
a noise data acquisition section acquiring first noise data based on pixel signals produced in the second pixels in the first imaging action and acquiring second noise data based on pixel signals produced in the second pixels in the second imaging action;
a monitoring section monitoring the amount of the second noise data; and
a noise correction section removing a noise component from the first image data,
wherein the imaging control section initiates the second imaging action after the first imaging action is completed and terminates the second imaging action when the amount of the second noise data becomes substantially the same as the amount of the first noise data, and the noise correction section removes the noise component by subtracting the second image data from the first image data.

8. An imaging apparatus comprising:

an imaging device including first pixels capable of receiving light from a subject and second pixels incapable of receiving the subject light;

an imaging control section carrying out a first imaging action in an exposure period during which the imaging device is exposed to light and carrying out a second imaging action in a non-exposure period during which the imaging device is not exposed to light;

a first storage section storing first image data acquired from the first pixels in the first imaging action;

a second storage section storing second image data acquired from the first pixels in the second imaging action and noise image data acquired from the second pixels in the second imaging action;

a noise data acquisition section acquiring first noise data based on pixel signals produced in the second pixels in the first imaging action and acquiring second noise data based on the noise image data;

a noise estimation section estimating a noise component contained in the first image data by using the second image data and a noise ratio of the noise generated in the exposure period to the noise generated in the non-exposure period, the noise ratio calculated by using the first noise data and the second noise data;

a noise correction section removing the noise component from the first image data; and a monitoring section monitoring the amount of the second noise data, wherein the imaging control section initiates the second imaging action after the first imaging action is completed and terminates the second imaging action when the amount of the second noise data becomes substantially the same as the amount of the first noise data.

* * * * *